Aug. 2, 1960 G. SLAYTER 2,947,028
APPARATUS FOR MANUFACTURE OF FIBROUS GLASS
Filed Nov. 19, 1954 3 Sheets-Sheet 1
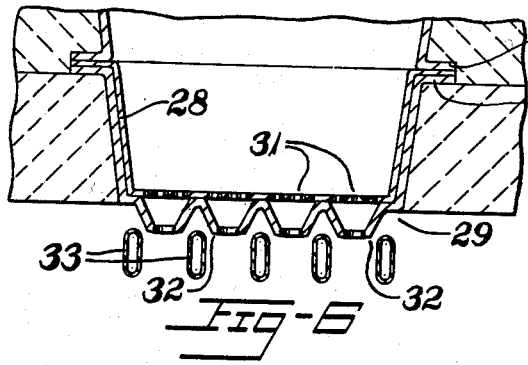
Fig-6
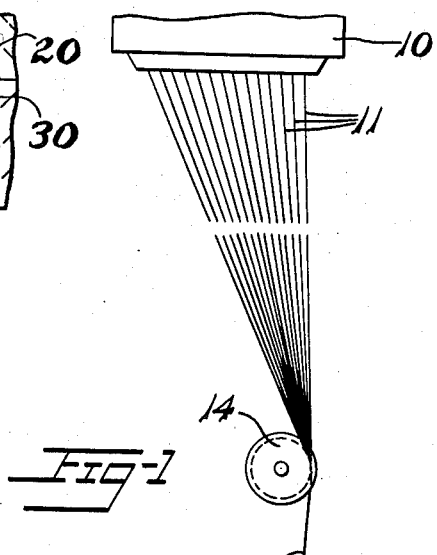
Fig-1
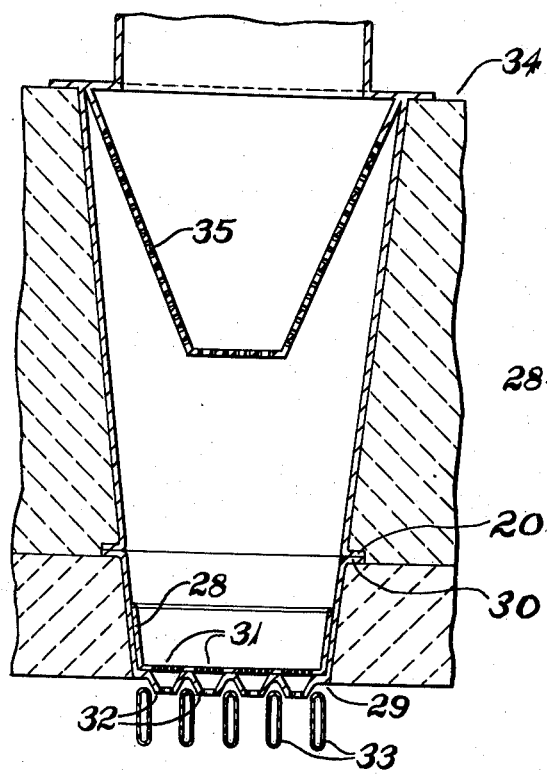
Fig-8
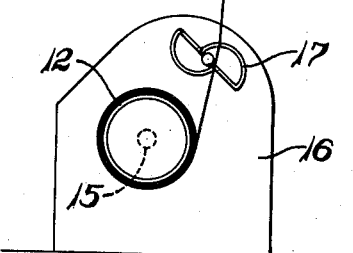
Fig-7
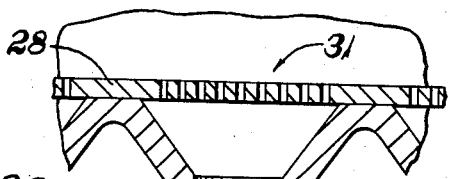
INVENTOR.
GAMES SLAYTER
BY
ATTYS.

Aug. 2, 1960     G. SLAYTER     2,947,028
APPARATUS FOR MANUFACTURE OF FIBROUS GLASS
Filed Nov. 19, 1954     3 Sheets-Sheet 2

INVENTOR.
GAMES SLAYTER
BY
ATTYS.

Aug. 2, 1960　　　　G. SLAYTER　　　　2,947,028
APPARATUS FOR MANUFACTURE OF FIBROUS GLASS
Filed Nov. 19, 1954　　　　　　　3 Sheets-Sheet 3
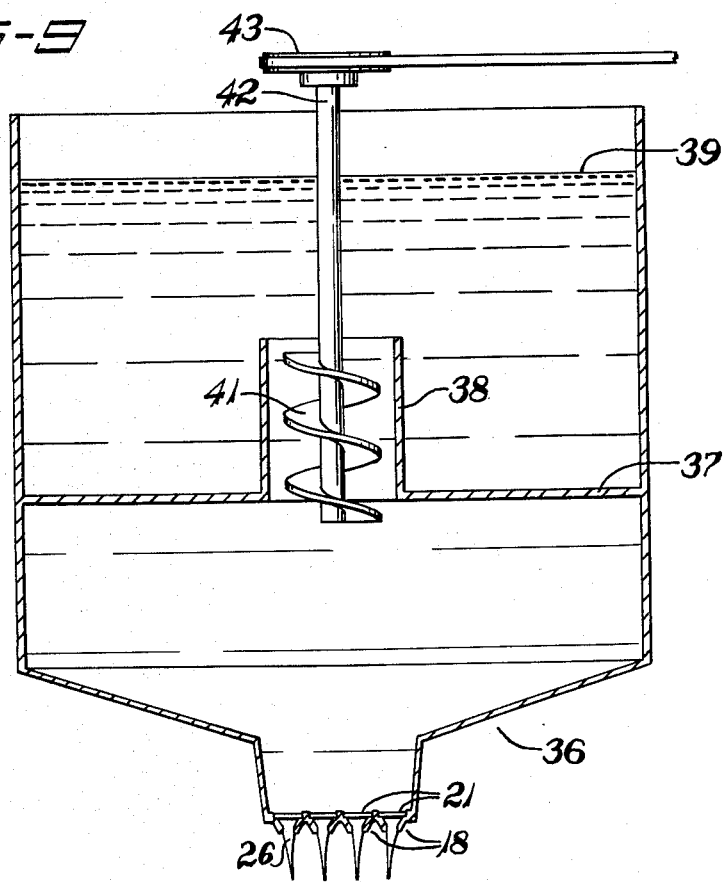
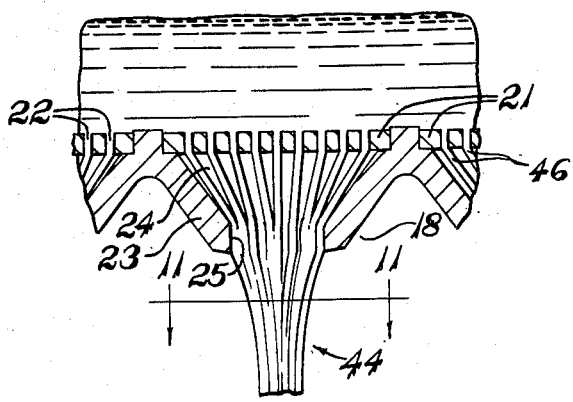
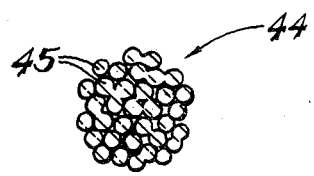
INVENTOR.
GAMES SLAYTER
BY
ATTYS.

United States Patent Office 2,947,028
Patented Aug. 2, 1960

2,947,028
APPARATUS FOR MANUFACTURE OF FIBROUS GLASS

Games Slayter, Newark, Ohio, assignor to Owens-Corning Fiberglas Corporation, a corporation of Delaware Filed Nov. 19, 1954, Ser. No. 469,922

3 Claims. (Cl. 18—8)

This invention relates to the production of fibers from glass and other materials that in flowable state can be drawn out into fibers.

This application is a continuation-in-part of an application having Serial Number 266,748 filed in the name of the present inventor.

In producing fibrous glass it is highly desirable to have complete homogeneity in the molten glass from which the fibers are produced in order to make it possible to form continuous fibers. It is known that there are several forms of foreign matter in molten glass which tend to cause interruptions in the fiber forming operations. For instance, cords in the molten glass resulting from certain components of the refractory becoming a solute in the molten glass which acts as a solvent, stones, and seeds cause interruptions in the fiber forming process as they pass through the orifices of the feeder. Likewise it is known that molten glass when maintained at very high temperatures tends to become more and more homogeneous with a more nearly true solution existing as the temperature is elevated. The simple expedient of raising the operating temperature at which fibrous glass is produced to provide homogeneity cannot be used since the glass becomes watery and very difficult to handle in the fiber forming operation.

It is an object of the invention to provide fibers exhibiting improved properties.

It is another object to so work the glass in a fluid state and prior to attenuation of the glass into fibers that the glass is conditioned to increase the strength of the fibers made therefrom.

It is another object to break up or elongate any crystalline or microcrystalline aggregates of molecules so as to prevent interruption of the fiber forming process.

Another object of the invention is to provide a feeder for molten glass that strings out the glass into a multiplicity of minute streamlets as it forms the glass into streams from which the fibers are attenuated.

It is still another object of the invention to provide a process of making glass fibers in which the glass is flowed into streams to be attenuated into fibers, and in cooperation with this stream formation, the glass is subdivided into a multiplicity of minute streamlets that are then recombined and immediately attenuated into fibers.

It is an object of this invention to provide apparatus that gives continuous fiber forming operation with resultant high quality fibrous products.

According to the invention, glass in a molten condition is flowed into a plurality of streams and the streams are attenuated into fine fibers. Usually the fibers are then collected together into a strand and the strand thus formed is wound into a suitable package or otherwise collected. In the present case, the glass as it is flowed into the stream from which the fiber is attenuated is strung out into a multiplicity of minute streamlets, each of exceedingly small diameter and by this operation the glass is hydraulically worked so as to be conditioned to provide the desired improved physical properties in the fiber. This working of the glass into minute streams causes all portions of the glass to be homogenized or strung out into fine stria so that any aggregates of molecules are oriented so that they all extend in substantially the same direction and thus impart added strength to the fibers.

These aggregates of molecules apparently are the result of incipient crystallization or devitrification; that is, the molecules have started to become oriented and collected in the position they would assume if the glass were crystallized, but this action has not proceeded to the actual crystalline state. Evidence of this precrystalline state or incipient crystallization has been observed in electron micrographs of very fine fibrous glass. When fibers in the order of a few hundred thousandths of an inch in diameter are magnified 20,000 times, it is observed that those fibers that are visible as translucent bodies show within the body a nodular arrangement with the nodules showing up as grayish blobs with fuzzy and indistinct borders, but nevertheless as dense zones of greater opacity in the areas between the zones.

Such dense zones are apparently molecular aggregates that are in the process of coming into the regular orientation that is characteristic of crystals. It may be that these nodules are not yet grown to crystalline dimensions (thus subcrystalline) but rather constitute crystalline nuclei. These aggregates are herein referred to as incipient crystals and the effect is referred to as incipient crystallization or incipient devitrification.

It is believed that subcrystalline or microcrystalline structure in the fluid glass is present depending upon the temperature at which the molten glass is being maintained and the time interval at which the molten glass has remained at that temperature. The presence of these aggregates of crystalline or microcrystalline structure likewise depends upon the cooling rate to which the molten glass is subjected. The present apparatus functions to break up the crystalline, subcrystalline and microcrystalline structures.

It has been discovered that if glass that is in this state of incipient crystallization is divided into many fine streamlets of glass immediately prior to the formation of fibers by attenuation of streams of molten glass, that interruption-free operation can be achieved and that orientation of the aggregates of molecules or incipient crystals can be achieved with resultant improved physical properties in the fibrous glass so produced, including increased strength and greater resistance to fracture of the glass. In the present invention the streaming out of the glass or breaking up of the aggregates of molecules is achieved by passing the molten glass through a filter disc or plate having a plurality of fine diameter holes or openings. The small streams of glass so formed are then directed immediately into the forming cone from which fibrous glass is produced.

The glass is rapidly cooling throughout the operation of subdivision and attenuation so that any orientation imparted to the molecular structure of the glass is quickly frozen into the glass as the glass solidifies.

Referring to the drawings:

Figure 1 is an elevational view of one form of fiber forming operation to which present invention applies;

Figure 6 is an enlarged cross-sectional view of another embodiment of the invention utilizing a filter plate;

Figure 7 is a similar view greatly enlarged showing one of the tips of the feeder of Figure 6;

Figure 8 is a cross-sectional view of a feeder and marble melting device;

Figure 9 is a schematic cross-sectional view of a feeder for the molten glass in which the glass in the feeder is adapted to be put under pressure;

Figure 10 is an enlarged cross-sectional view of a tip such as that shown in Figure 3 with the flow of glass indicated;

Figure 11 is an enlarged cross-sectional view on line 11, 11 of Figure 10.

Figure 2:
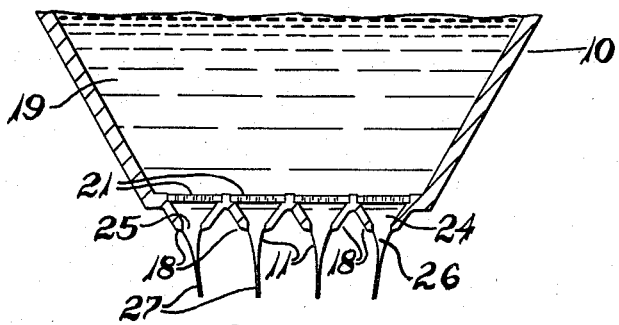
Figure 2 is an enlarged cross-sectional view of the feeder used for forming the streams of molten glass which are then attenuated into fibers.
Figure 4:
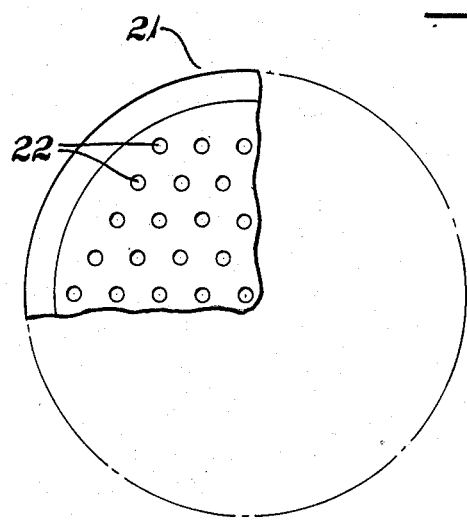
Figure 4 is a plan view greatly enlarged of the filter disc adapted for placement in one of the feeder tips.
Figure 5:
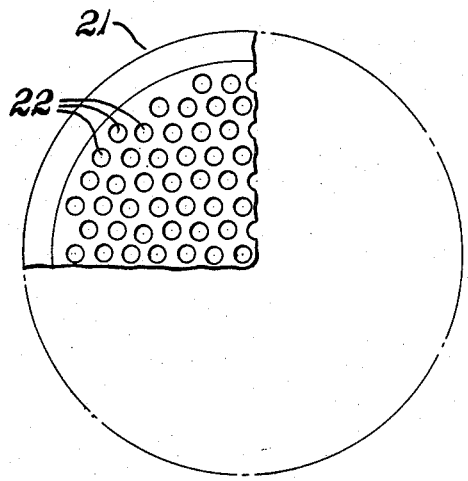
Figure 5 is a plan view of another embodiment of the filter disc.

The present invention has utility wherever glass is converted to fabricated articles, but it has particular utility in the manufacture of fibers from glass and it can be applied to any of those processes where glass in a molten state is flowed into small streams, and these streams are then attenuated into fibers by the application thereto of suitable forces, for instance, by mechanically pulling the streams and attenuating them into fibers or by the application to the streams of a blast of gas or steam moving at high velocity in a manner to draw out the streams into fibers.

One such process of manufacturing glass fibers is shown schematically in Figure 1 where 10 represents the feeder from which the streams of molten glass flow, 11 represents the streams as they are drawn into fibers and 12 is a collet upon which the fibers are wound in the form of a strand 13, which strand results from the collection of the fibers 11 into a bundle by means of a gathering wheel or other suitable device 14.

The collet 12 is mounted on a shaft 15 journalled in suitable bearings in frame 16 which also supports a traversing device 17, which helps form the desired package upon collet 12.

Feeder 10, shown in more detail in Figure 2, is provided with a plurality of tips 18, 18 through which the molten glass 19 emits in the form of streams of glass 11. These streams of glass 11, 11 are attenuated into fibers by the pulling action of collet 12. A plurality of these tips are arranged on the bottom wall of the feeder 10, the tips being aligned in rows and with several rows of such tips running lengthwise of the feeder.

Figure 3:
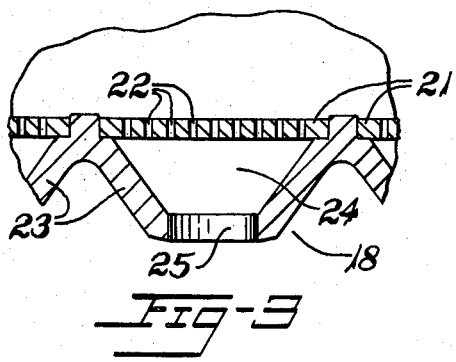
Figure 3 is a similar view but on a much larger scale showing one of the tips of the feeder.

The tip 18 comprises a filter disc 21 having a plurality of small diameter holes 22, 22, a skirt 23 which defines chamber 24 having an orifice 25, see Figures 2 and 3. As the molten glass 19 flows through tips 18, 18 of feeder 10, the molten glass is divided into many small streams of glass as it passes through filter disc 21 and then the streams of glass recombine in chamber 24 and immediately pass through orifice 25 into a forming cone 26 wherein the attenuation takes place to form a fiber 27.

Filter discs 21, 21 shown in Figures 2, 3, 4, 5, 9 and 10 are produced by drilling or punching a metal disc of a suitable metal or alloy such as a platinum alloy. For instance, holes of a very small diameter have been drilled by using twist drills which are advanced by electronic control circuits such as those employed in the available microdrills. The size of the holes drilled are from five-thousandths to about twenty-thousandths of an inch in diameter. The holes may also be punched in diameters of from 0.005″ to 0.020″. The discs are very small in diameter; however, from 30 to 95 holes are spaced within a single disc. For instance, a disc having a diameter of 0.175″ has been provided with 91 holes having a diameter of 0.010″. As the glass flows through these holes 22, 22 in filter disc 21, it is strung out into exceedingly small streams which effect a hydraulic working of the molten glass to properly condition it for obtaining the best properties in the finished fiber.

In one method a disc is first formed with holes having a diameter of from 20 to 40 thousandths of an inch in diameter. The disc is then submerged in a bath of molten glass heated to a temperature at which it has a viscosity of from 300 to 500 centipoises. At low viscosity the molten glass fills the holes and remains therein when the disc is removed from the molten glass. The disc is then forged in a conventional forging operation and preferably while heated to normal forging temperature so as to be reduced substantially in diameter and drawn out into a slender cylinder. As the diameter of the disc is reduced so are the holes within the disc reduced. By this method extremely fine passages down to three ten-thousandths of an inch in diameter and even smaller can be produced.

The plug may be made in several ways. For instance, the plug is made of a piece of corrugated metal foil of about five-thousandths of an inch in thickness which is rolled up on itself so that the crests of the corrugations abut each other and the troughs of the corrugations are aligned with each other so that these aligned troughs form passages extending across the width of the foil and lengthwise through the resulting plug. After the foil has been rolled up in this way the resulting plug need only be inserted into the nipple of the feeder. The plug may be sliced off to form discs such as those shown in Figure 3.

Another method of forming a disc or plug is as follows: A multiplicity of glass fibers are gathered together into a compact bundle. The fibers are each coated with a metallic coating, such as a coating of gold or platinum or the like, applied by any suitable process as, for instance, by electrodeposition. After the coated fibers are gathered together into a compact bundle they are held together under high pressure and simultaneously subjected to a heating operation, for instance, by being placed in a high frequency electrical field. The heating operation, combined with the pressure exerted on the bundle, welds the coated fibers together at their points of contact. After the welding operation the bundle of welded, coated fibers is cut to the desired length and used as the filter disc in the tip. Subsequently when the feeder is placed in operation and heated to the temperature required to melt glass, the glass fibers in the plug are fused and the resulting molten glass flows from the plug leaving a plurality of exceedingly fine tubules through which the molten glass passes through the feeder.

In Figure 6 is shown another embodiment of the invention wherein a plate filter 28 is disposed on the inner side of feeder 29 in such a manner that patches of holes 31, 31 are positioned immediately above tips 32, 32. These tips are arranged in the desired number of rows along the length of the feeder. One, two, three or more rows of tips may be arranged to provide the total number of tips which are desired. Cooling fins 33, 33 may be positioned adjacent to the rows of tips as shown. The cooling fins may be secured to a manifold which is a passage for water or other cooling liquid, or the fins may be tubes through which the coolant flows at a flow rate which provides the desired fin temperature.

Figure 8 shows a melter and feeder 34 which is adapted for melting cullet in the form of marbles or for handling molten glass from a forehearth of a furnace. Screen 35 is disposed in the melter to prevent cullet from dropping downwardly into feeder 29. The plate filter 28 may be secured between flanges 20 and 30 of the melter and feeder, respectively, as in Figure 6, or the plate filter may extend only part way up the walls of the feeder as shown in Figure 8, the plate filter being welded to the walls of the feeder. The plate filter which is preferably fabricated of platinum, platinum alloy or a heat and corrosion resistant base metal alloy or the like is formed by pressing it into a position in the feeder as shown in either Figure 6 or 8.

The holes in the plate filter 28 may be spaced throughout the extent of the plate filter or may be located in patches that align with the tips 32, 32 when the plate filter is pressed into position in the feeder 29. The spacing of the holes and the hole diameter is similar or the same as is used in the filter discs shown in Figures 4 and 5.

In some cases it is desirable to increase the pressure on the molten glass in the feeder to facilitate or increase the flow of glass through the small diameter passages in the filter discs or filter plate. Toward this end any conventional means may be employed. For instance, application of air pressure to the interior of the bushing is provided or preferably the depth of glass in the feeder is substantially increased so as to exert a greater pressure at the filter plate or filter disc. The actual metering device in the apparatus of this invention is the filter plate or disc whichever is used. Alternatively, mechanical means are employed to increase the pressure at the metering device, for instance, by employing an apparatus similar to that shown in Figure 9.

In Figure 9 a feeder 36 is provided with a horizontally disposed interior wall 37 which partitions the interior of the feeder into an upper and lower chamber. A tubular channel 38 extends upwardly from the horizontal interior wall 37 and terminates at its upper end well below the level 39 of molten glass in the feeder. Located within tubular channel 38 is a screw 41 that is generally of the form of ordinary feeding or conveying screws and is mounted on the lower end of a shaft 42 extending to the top of the feeder and at the outside of the feeder being provided with a sprocket 43 that has a suitable driving chain thereabout so as to apply power to the shaft 42 and thereby rotate the screw 41. Rotation of the screw 41 exerts pressure on the glass in the lower chamber to thereby increase the pressure on the glass at the tips and facilitate flow of the molten glass therethrough.

When manufacturing fibrous products by attenuation of individual streams of glass into fibrous form and gathering these individual fibers into the form of a strand while simultaneously advancing the strand by means of a pulling device, it has been past practice to advance the strand at speeds of from about 8,000 to 10,000 feet per minute. When such pulling speeds are used, the strand is advanced by the action of a pair of coacting pulling wheels or by the winding action of a collet or spool which is rotated on its axis. When speeds of this magnitude are used in forming the fibrous product, the glass flowing through the holes of the filter disc or filter plate recombine in the tip section defined by the skirt of the tip before the molten glass arrives at the tip orifice; however, this recombination of the streams of glass takes place immediately prior to the formation of the stream or cone of glass from which the fiber is attenuated. Any cords, microcrystalline structure, or other non-homogeneous structure in the molten glass are broken up as the molten glass is formed into many streams by the action of its passing through the filter disc or filter plate. The original magnitude of the non-homogeneous structure is never again attained even after the individual streams of glass passing through the plurality of holes of the filter disc or plate recombine since the time interval is very short between the time the molten glass enters the tip, is subdivided, and then forms into a fiber. Thus, breaking up of any structure, crystalline or microcrystalline, makes it possible to improve the physical properties of the fibers formed since discontinuities in the fiber forming operation due to individual filaments breaking out near the feeder tips is done away with.

In Figure 10 is shown a greatly enlarged cross-section of the apparatus of this invention with streamlets 46, 46 of molten glass flowing from the small diameter holes 22, 22 in filter disc 21. The individual streamlets 46, 46 emitting from the holes of the filter disc are attenuated while the glass is in chamber 24 defined by skirt 23. The orifice 25 no longer is a factor in determining the diameter of the fiber being produced nor does it determine rate of flow. Rather, the skirt acts as a heat radiation shield only, the attenuation taking place in the individual streamlets 46, 46 of glass emitting from the holes of the filter disc. Some of the individual streamlets produced recombine; however, the resulting fiber 44 comprises a plurality of filaments 45, 45 which are joined in a discontinuous manner along their interfaces. Such a fiber is producible when strand pulling rates are in the order of from 20,000 to 30,000 feet per minute or more. Upon using a filter plate such as shown in Figure 7, similar results are attained if very high pulling rates are used. With present pulling equipment capable of advancing a strand or an individual filament at speeds up to 35,000 feet per minute, greatly improved properties are achieved because of the orientation which takes place in the crystalline and microcrystalline structures in the glass and because of the discontinuous coupling of the individual filaments within a single fiber at the interfaces of the filaments. For instance, the probability of crack propagation is greatly decreased since a crack will travel to the interface of filaments at points where the filaments are not fused together and then will stop leaving the rest of the cross-section of the fiber undamaged.

Since the filtering disc or filter plate introduces a resistance to flow, it is desirable to increase the operating temperature of the molten glass above that normally used with feeders having no filtering means. As a result of the increased temperature, the glass becomes more homogeneous since any crystalline or microcrystalline structure and any stones tend to dissolve in the molten glass bath, and cords are dispersed. Cords, stones and the like are broken up into very small non-homogeneous masses which do not interrupt the fiber forming process.

The filter disc or plate acts as a metering means which, because of its location away from the induced air and any foreign matter which may be carried along with the induced air, makes it now possible to operate under equilibrium conditions that not only provide greatly improved physical properties in the fibrous glass produced, but also do away with interruptions in the forming process. The skirt of the tip actually acts as a heat radiation shield for the metering means, i.e., the filter disc or filter plate. This shielding of the metering means promotes thermal equilibrium.

It is possible to remove the skirts 23 so that the individual streams emitting from the many holes of the filter disc simply attenuate and come together into the form of a single fiber without the funneling effect of the skirt of the tip. A tip having no skirt but rather only small retaining lips to prevent flooding between tips is advantageously used with ultra-high speed pulling equipment. Cooling fins are preferably used with the skirt-less tip feeder. By using cooling fins such as that shown in Figure 6 with a feeder having skirt-less tips heat can be removed controllably from the glass in order to maintain the individual integrity of the filaments which make up the single fiber and provide the structure shown in Figure 11 in order to achieve unusual physical properties including resistance to crack propagation.

Any refractory stones are filtered out when they hit the filter disc or filter plate and they then have a chance to dissolve in the molten glass flowing thereby instead of passing downwardly to the tip where the stone would cause an interruption in the flow of glass. The passing of a stone through a tip results in the breaking out of the fiber which is produced by that tip. The quality of the strand being produced is immediately affected since the number of fibers in the strand is reduced.

The advantages which have been achieved include considerable improvement in the quality of the fibrous glass produced. The improvement is a result of better uniformity in regard to fiber diameter and tensile strength, a great reduction in the number of interruptions in the operation due to breaking out of individual fibers produced by a feeder, increased strength, and general improvement due to orientation and breaking up of the crystalline aggregates in the molten glass. Production of a multifilament fiber at high forming speeds provides added strength and resistance to crack propagation. Since the metering means is positioned in such a manner that the atmosphere about the feeder has little or no effect on the temperature of the molten glass passing through the metering means, equilibrium conditions are achieved and great improvement in uniformity of product results.

The feeders of this invention are advantageously combined with cooling fins or tubes disposed about the tips of the feeders. It has been discovered that glass of unusual strength can be obtained by forming the fibers from molten glass which is maintained at elevated temperatures above those temperatures normally used when operating without cooling devices and is then cooled rapidly. Rapid cooling is inherent in the attenuation process but the effect of temperature control devices such as cooling fins adds to the total effect. The filter discs or plates act as a metering means and as a means for helping to handle very watery glass which is at an operating temperature greater than that normally used and the cooling fins or tubes likewise cool the watery glass rapidly so that its viscosity is increased enough to make it possible to attenuate the streams of glass.

Obvious modifications and variations may be made within the spirit and scope of the appended claims.

I claim:

1. Apparatus for producing fibrous glass comprising a receptacle for molten glass having a plurality of feeding orifices therein for feeding streams of molten glass to be attenuated into fibers and gathered together in the form of a strand, including a plurality of closely spaced, side by side nipples projecting from a surface of the receptacle, each of said nipples having a feeding passage therethrough, and disposed immediately above and in contact with the nipples a plate having a plurality of small openings arranged in patches, which patches are aligned with said feeding passages in said nipples.

2. Apparatus for producing fibrous glass comprising in combination a feeder having a plurality of nipples each of which contains a passage through which molten glass flows in the form of a stream attenuable into a fiber, associated with said nipples cooling means for rapidly and controllably removing heat from said nipples and from the molten glass passing therethrough, and a plate having a plurality of small holes arranged in patches of holes disposed in such a manner with respect to said passages that molten glass flows through the small holes of a patch of said plate and then and only then immediately into and through one of said passages.

3. Apparatus for producing fibrous glass comprising a receptacle for molten glass having a plurality of feeding orifices therein for feeding streams of molten glass to be attenuated into fibers and gathered into a strand, said receptacle comprising an upper portion and a lower matching portion, both of which portions have outwardly turned flanges in their walls that mate to form a liquid-tight seal for the walls that define said receptacle, said lower portion having a bottom which contains a plurality of side by side nipples each of which contains an orifice through which molten glass flows and upstanding walls extending from the bottom and culminating in said outwardly turned flanges, and nested inside said lower portion of the receptacle a cup-like member comprising a bottom plate and upstanding walls extending therefrom which culminate in outwardly turned flanges, the bottom plate having spaced apart patches of holes, each of said patches being in register with an orifice of one of said nipples, the flange of said cup-like member being secured between the flanges of the upper and lower portions of said receptacle and the bottom plate of said cup-like member being positioned immediately above and in contact with the nipples of said lower portion of the receptacle to prevent flow of molten glass through any one orifice except via the patch of holes in register with said orifice.

References Cited in the file of this patent

UNITED STATES PATENTS

| Re. 24,060 | Russell | Sept. 6, 1955 |
| 1,604,216 | Brainin | Oct. 26, 1926 |
| 1,654,936 | Jones | Jan. 3, 1928 |
| 1,954,732 | Gossler | Apr. 10, 1934 |
| 2,133,236 | Slayter | Oct. 11, 1938 |
| 2,194,814 | Stewart | Mar. 26, 1940 |
| 2,215,982 | Slayter | Sept. 24, 1940 |
| 2,306,164 | Harrison | Dec. 22, 1942 |
| 2,535,561 | Bastian | Dec. 26, 1950 |
| 2,577,213 | Slayter | Dec. 4, 1951 |
| 2,586,774 | Bastian | Feb. 26, 1952 |
| 2,635,389 | Toulmin | Apr. 21, 1953 |
| 2,699,631 | Stalego | Jan. 18, 1955 |
| 2,780,890 | Russell | Feb. 12, 1957 |

FOREIGN PATENTS

| 1,003,082 | France | Nov. 14, 1941 |
| 381,582 | Great Britain | Sept. 29, 1932 |